US012645644B2

(12) United States Patent
    Qi et al.

(10) Patent No.:    US 12,645,644 B2
(45) Date of Patent:        Jun. 2, 2026

(54) COMPACTION METHOD AND DEVICE FOR SORTED STRINGS TABLE FILES

(71) Applicant: SAMSUNG ELECTRONICS CO., LTD., Suwon-si (KR)

(72) Inventors: Hui Qi, Suwon-si (KR); Peng Yun, Suwon-si (KR)

(73) Assignee: SAMSUNG ELECTRONICS CO., LTD., Suwon-si (KR)

( * ) Notice:   Subject to any disclaimer, the term of this patent is extended or adjusted under 35 U.S.C. 154(b) by 0 days.

(21) Appl. No.: 18/583,335

(22) Filed:     Feb. 21, 2024

(65)              Prior Publication Data
     US 2025/0077475 A1      Mar. 6, 2025

(30)        Foreign Application Priority Data
   Aug. 31, 2023    (CN) .......................... 202311118365.X

(51) Int. Cl.
     *G06F 16/174*       (2019.01)
     *G06F 16/22*        (2019.01)
(52) U.S. Cl.
     CPC ...... *G06F 16/1744* (2019.01); *G06F 16/2246* (2019.01)
(58) Field of Classification Search
     CPC .......................... G06F 16/2246; G06F 16/1744
     See application file for complete search history.

(56)              References Cited

U.S. PATENT DOCUMENTS

| | | | |
|---|---|---|---|
| 2021/0210151 A1* | 7/2021 | Pawlowski | G06F 12/0873 |
| 2023/0033773 A1* | 2/2023 | Choi | G06F 16/2282 |
| 2023/0153006 A1* | 5/2023 | Zhang | G06F 3/0659 |
| | | | 711/154 |
| 2023/0229651 A1* | 7/2023 | Dayan | G06F 16/2358 |
| | | | 707/797 |

FOREIGN PATENT DOCUMENTS

| | | |
|---|---|---|
| CN | 115168317 A | 10/2022 |
| CN | 115291796 A | 11/2022 |
| CN | 115480707 A | 12/2022 |
| CN | 115686355 A | 2/2023 |
| CN | 115857835 A | 3/2023 |

OTHER PUBLICATIONS

Lee et al, Compaction-Aware Zone Allocation for LSM based Key-Value Store on ZNS SSDs , Proceedings of HotStorage'22, Jun. 27-28, 2022, Virtual Event, USA; pp. 93-99 (Year: 2022).*

(Continued)

*Primary Examiner* — Marc S Somers
(74) *Attorney, Agent, or Firm* — Sughrue Mion, PLLC

(57)              ABSTRACT

A compaction method and device for SST files are provided. The method includes identifying one or more first SST files and one or more second SST files, obtaining priority information based on a key overlapping ratio between the one or more first SST files and one or more second SST files, obtaining attribute information of zones corresponding to the one or more first SST files and the one or more second SST files, and performing compaction on a first SST file, among the one or more first SST files based the priority information.

16 Claims, 9 Drawing Sheets

(56) References Cited

OTHER PUBLICATIONS

Zhang et al, FlameDB: A Key-Value Store With Grouped Level Structure and Heterogeneous Bloom Filter, Apr. 30, 2018, pp. 24962-24972. (Year: 2018).*

Zhan et al, RangeKV: An Efficient Key-Value Store Based on Hybrid DRAM-NVM-SSD Storage Structure, IEEEAccess, Aug. 18, 2020, 12 pp. (Year: 2020).*

Lee et al, iLSM-SSD: An Intelligent LSM-tree based Key-Value SSD for Data Analytics, 2019 IEEE 27th International Symposium on Modeling, Analysis, and Simulation of Computer and Telecommunication Systems (MASCOTS), 12 pp. (Year: 2019).*

Extended European Search Report dated Oct. 8, 2024, issued by the European Patent Office in European Application No. 24165042.3.

Jung et al., "Lifetime-Leveling LSM-Tree Compaction for ZNS SSD", HotStorage '22, Jun. 2022, pp. 100-105 (6 pages total).

Luo et al., "LSM-based storage techniques: a survey", The VLDB Journal, 2020, vol. 29, pp. 393-418 (26 pages total).

* cited by examiner

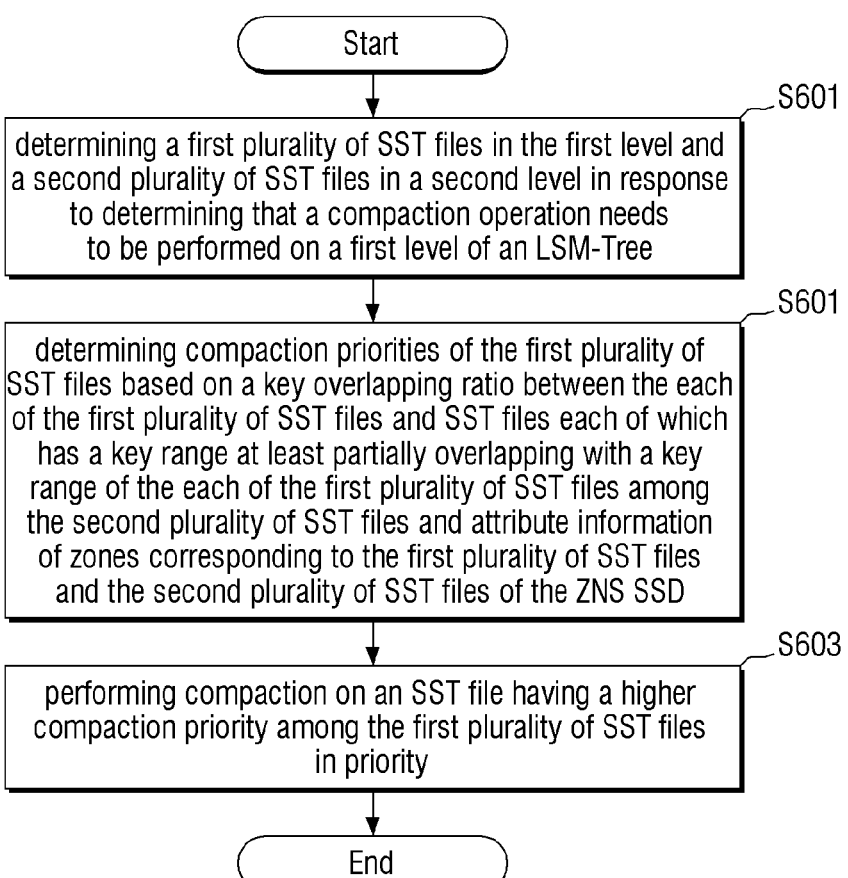

Start

S601 determining a first plurality of SST files in the first level and a second plurality of SST files in a second level in response to determining that a compaction operation needs to be performed on a first level of an LSM-Tree

S601 determining compaction priorities of the first plurality of SST files based on a key overlapping ratio between the each of the first plurality of SST files and SST files each of which has a key range at least partially overlapping with a key range of the each of the first plurality of SST files among the second plurality of SST files and attribute information of zones corresponding to the first plurality of SST files and the second plurality of SST files of the ZNS SSD

S603 performing compaction on an SST file having a higher compaction priority among the first plurality of SST files in priority End

FIG. 8

COMPACTION METHOD AND DEVICE FOR SORTED STRINGS TABLE FILES

CROSS-REFERENCE TO RELATED APPLICATIONS

This application is based on and claims priority under 35 U.S.C. § 119 to Chinese Patent Application No. 202311118365.X, filed on Aug. 31, 2023, in the China National Intellectual Property Administration, the disclosure of which is incorporated by reference herein in its entirety.

BACKGROUND

1. Field

The disclosure relates to a data storage, and more specifically, to a compaction method and a device for storing sorted strings table (SST) files.

2. Description of Related Art

Data stored based on a Log-Structured Merge-Tree (LSM-Tree) storage structure (e.g., a RocksDB or a LevelDB) may be stored in a zoned storage, for example, in a Zoned Namespaces (ZNS) Solid State Drive (SSD). In a zoned storage, an address space may be divided into zones, in which, data is sequentially written. A compaction operation may be performed on a plurality of SST files stored in zones of a ZNS SSD of levels of an LSM-Tree. The plurality of SST files become invalid files in the zones and new SST files generated by the compaction operation are stored in a zone with free space of the ZNS SSD after the compaction operation. According to storage mechanism of the ZNS SSD, a zone may be reclaimed only when all the files in the zone are invalid (i.e., when there are no valid data fragments in the zone).

SUMMARY

According to an aspect of the disclosure, there is provided a method for sorted string table (SST) files stored in zones of a zoned namespace solid state drive (ZNS SSD), the method including determining, based on a compaction operation for a first level of a Log Structure Merge Tree (LSM-Tree), a plurality of first SST files in the first level and a plurality of second SST files in a second level, wherein a key range of at least one of the plurality of first SST files at least partially overlaps with key ranges of the plurality of second SST files in the second level, and a key range of at least one of the plurality of second SST files at least partially overlaps with key ranges of the plurality of first SST files, wherein the second level is a level of the LSM-Tree that is adjacent to the first level and higher than the first level, obtaining priority information of the plurality of first SST files based on a key overlapping ratio between each of the plurality of first SST files and one or more second SST files, among the plurality of second SST files, and attribute information of zones corresponding to the plurality of first SST files and the plurality of second SST files, the one or more second SST files comprising a key range at least partially overlapping with a key range of each of the plurality of first SST files and performing compaction on a first SST file having a highest compaction priority among the plurality of first SST files based the priority information.

According to another aspect of the disclosure, there is provided a device for sorted string table (SST) files stored in zones of a zoned namespace solid state drive (ZNS SSD), including: a memory storing one or more instructions; and a processor configured to execute the one or more instruction to: determine, based on a compaction operation for a first level of a Log Structure Merge Tree (LSM-Tree), a plurality of first SST files in a first level of a Log Structure Merge Tree (LSM-Tree) and a plurality of second SST files in a second level, wherein a key range of at least one of the plurality of first SST files at least partially overlaps with key ranges of the plurality of second SST files in the second level, and a key range of each of the plurality of second SST files at least partially overlaps with key ranges of the plurality of first SST files, wherein the second level is a level of the LSM-Tree that is adjacent to the first level and higher than the first level; obtain priority information of the plurality of first SST files based on a key overlapping ratio between each of the plurality of first SST files and one or more second SST files, among the plurality of second SST files, and attribute information of zones corresponding to the plurality of first SST files and the plurality of second SST files, the one or more second SST files comprising a key range at least partially overlapping with a key range of each of the plurality of first SST files; and perform compaction on a first SST file having a highest compaction priority among the plurality of first SST files based the priority information.

According to another aspect of the disclosure, there is provided an electronic device including: a processor; and a memory configured to store instructions that when executed by the processor cause the processor to: identify one or more first SST files and one or more second SST files, wherein a key range of the one or more first SST files at least partially overlaps a key range of the one or more second SST files; obtain priority information based on a key overlapping ratio between the one or more first SST files and one or more second SST files; obtain attribute information of zones corresponding to the one or more first SST files and the one or more second SST files; and perform compaction on a first SST file, among the one or more first SST files based the priority information.

BRIEF DESCRIPTION OF DRAWINGS

The above and other aspects, features and advantages of certain embodiments of the disclosure will become more apparent through the following descriptions made in conjunction with the figures schematically illustrating the embodiments, in which:

FIG. 2 illustrates a correspondence relationship between levels of an LSM-tree and zones of a Zoned Namespaces (ZNS) Solid State Drive (SSD);

FIG. 6 illustrates a flowchart of a method for compacting SST files according to an embodiment of the disclosure;

FIG. 8 illustrates a diagram of a compaction method for SST files according to an embodiment of the disclosure versus a related art method.

DETAILED DESCRIPTION

Figure 1:
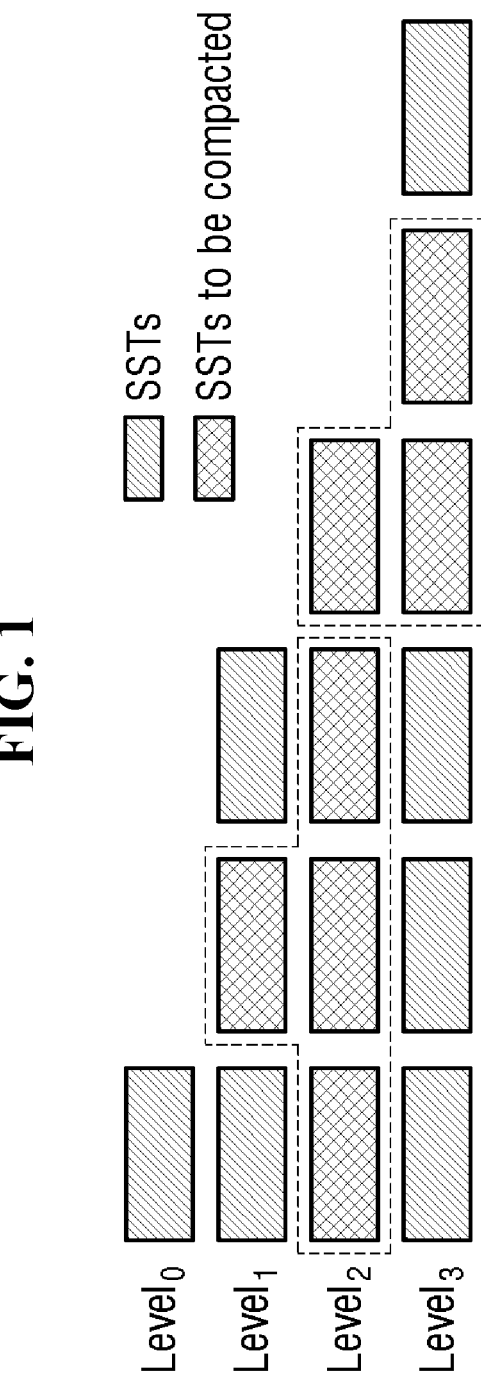
FIG. 1 illustrates an example of a structure of a Log-Structured Merge-Tree (LSM-tree)

An example of compaction may include determining a compaction order of SST files in a start level based on key overlapping ratios of the SST files in the start level in relation to SST files in an output level that participate in the compaction operation, and such a compaction mechanism may not ensure that an SST file corresponding to a zone that can be reclaimed as soon as possible is compacted based on priority, resulting in the zone that cannot be recovered in time, thereby reducing utilization rate of storage space of the ZNS SSD.

Therefore, a data compaction mechanism that may improve the utilization rate of space of a ZNS SSD is needed.

Hereinafter, various embodiments of the disclosure are described with reference to the accompanying drawings, in which like reference numerals are used to depict the same or similar elements, features, and structures. However, the disclosure is not intended to be limited by the various embodiments described herein to a specific embodiment and it is intended that the disclosure covers all modifications, equivalents, and/or alternatives of the disclosure, provided they come within the scope of the appended claims and their equivalents. The terms and words used in the following description and claims are not limited to their dictionary meanings, but, are merely used to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms include plural forms, unless the context clearly dictates otherwise. The terms "include," "include," and "have", used herein, indicate disclosed functions, operations, or the existence of elements, but does not exclude other functions, operations, or elements.

For example, the expressions "A or B," or "at least one of A and/or B" may indicate A and B, A, or B. For instance, the expression "A or B" or "at least one of A and/or B" may indicate (1) A, (2) B, or (3) both A and B.

In various embodiments of the disclosure, it is intended that when a component (for example, a first component) is referred to as being "coupled" or "connected" with/to another component (for example, a second component), the component may be directly connected to the other component or may be connected through another component (for example, a third component). In contrast, when a component (for example, a first component) is referred to as being "directly coupled" or "directly connected" with/to another component (for example, a second component), another component (for example, a third component) does not exist between the component and the other component.

The expression "configured to", used in describing various embodiments of the disclosure, may be used interchangeably with expressions such as "suitable for," "having the capacity to," "designed to," "adapted to," "made to," and "capable of", for example, according to the situation. The term "configured to" may not necessarily indicate "specifically designed to" in terms of hardware. Instead, the expression "a device configured to" in some situations may indicate that the device and another device or part are "capable of." For example, the expression "a processor configured to perform A, B, and C" may indicate a dedicated processor (for example, an embedded processor) for performing a corresponding operation or a general purpose processor (for example, a central processing unit (CPU) or an application processor (AP)) for performing corresponding operations by executing at least one software program stored in a memory device.

Further, in the disclosure, "a module", 'a unit", "a part" or other blocks may perform at least one function or operation, and may be implemented as hardware, software, or a combination of hardware and software. Also, a plurality of "modules", "a plurality of units" or a plurality of "parts" may be integrated into at least one module or at least one unit and implemented as at least one processor. However, the disclosure is not limited thereto, and as such, "a module", 'a unit", "a part" or other blocks may be implemented as specific hardware.

The terms used herein are to describe certain embodiments of the disclosure, but are not intended to limit the scope of other embodiments. Unless otherwise indicated herein, all terms used herein, including technical or scientific terms, may have the same meanings that are generally understood by a person skilled in the art. In general, terms defined in a dictionary should be considered to have the same meanings as the contextual meanings in the related art, and, unless clearly defined herein, should not be understood differently or as having an excessively formal meaning. In any case, even terms defined in the disclosure are not intended to be interpreted as excluding embodiments of the disclosure.

To facilitate understanding of the disclosure, the related technology is described as follows.

The ZNS SSD is a type of zone storage device that divides storage space into zones with a fixed size. Each of the zones may support only sequential writing. An interface for storage blocks of the ZNS SSD is open to outside to allow a host to determine where to place data based on an operational requirements. For instance, the host may determine where to place data based on a business need of an user the ZNS SSD. If writing is to be performed on a zone again, a specific command (e.g., a RESET command) has to be sent to reset the zone, so that all data stored in the zone is erased, and after all data stored in the zone is erased data writing is performed on the reset zone. A firmware (FW) of the ZNS SSD has no complex garbage collection (GC) mechanism, so there is no need for Over-Provisioning (OP), which allows users to use more effective space.

The LSM-tree include a memory table (MemTable) and a plurality of levels. The LSM-tree is structure that maintains one or more keys and value corresponding to the each of the respective keys. For example, the LSM-tree may maintain one or more key-value pairs. That is, a first key and a first value corresponding to the first key may be referred to as a first key-value pair and a second key and a second value corresponding to the first key may be referred to as a second key-value pair. In an example case, in which, a size of the MemTable reaches a reference size, the data in the MemTable is flushed into single SST file (which may be referred as SST below), and a plurality of SST files (which may be referred as SSTs below) are grouped together into a sorted sequence called a level. The reference size may be a predetermined size.

A compaction operation may be performed on SST files in the levels. For example, a candidate (or a target) SST file is selected from the ith level ($Level_i$), a compaction operation is performed on the selected candidate SST file, which has a key range at least partially overlapping with keys or a key range of SST files in the i+1th level (Level$_{i+1}$). In this case, one or more new SSTs are generated in the Level$_{i+1}$. During the compaction operation, zones that have been overwritten and deleted are reclaimed. According to an embodiment, a key range of the selected SST file from the ith level (Level$_i$) may at least partially overlap with keys or a key range of SST files in the i+1th level (Level$_{i+1}$) when one or more keys in the selected SST file are redundant with one or more keys in SST files in the i+1th level (Level$_{i+1}$). For example, the first SST file (e.g., the selected SST files) in the ith level (Level$_i$) may contain keys in a first range (e.g., [a, b, c, d]) and the second SST file (e.g., one or more of the SST files) in the i+1th level (Level$_{i+1}$) may contain keys in a second range (e.g., [c, d, e, f]), and as such keys 'c' and 'd' are overlapping. That is, keys 'c' and 'd' in the second SST file are redundant or duplicates.

FIG. 1 illustrates an example of a structure of an LSM-tree.

Here, the LSM-tree may include a first level level$_0$ including a first SST file, a second level level$_1$ including a first SST file, a second SST file and a third SST file, a third level level$_2$ including a first SST file, a second SST, a third SST file, and a fourth SST file, and a fourth level level$_3$ including a first SST file, a second SST, a third SST file, a fourth SST file, a fifth SST file and a sixth SST file. However, the disclosure is not limited thereto, and as such, number of levels and the number of SST files in each of the levels may be different than the illustrated in FIG. 1.

Referring to FIG. 1, a compaction operation may be performed on the second SST file in the level$_1$ and the first to third SST files in the level$_2$. Here, each of the first to third SST files in the level$_2$ has a key range at least partially overlapping with a key range of the second SST file of the level$_1$. Moreover, a compaction operation may be performed on the fourth SST file in level$_2$ and the fourth and fifth SST files in the level$_3$. Here, each of the fourth and fifth SST files in the level$_3$ has a key range at least partially overlapping with a key range of the fourth SST file of the level$_2$.

The LSM-tree based application is well suited for the ZNS SSD because writing of the SST files is sequential writing which is consistent with characteristics of the ZNS SSD.

The strategy for placing data on ZNS SSD of LSM-tree based database is to place SSTs of each level in a zone corresponding to the each level. SST files generated by SST files participating in a compaction operation have similar expiry time since the SST files in the same level have similar lifetimes.

Figure 2:
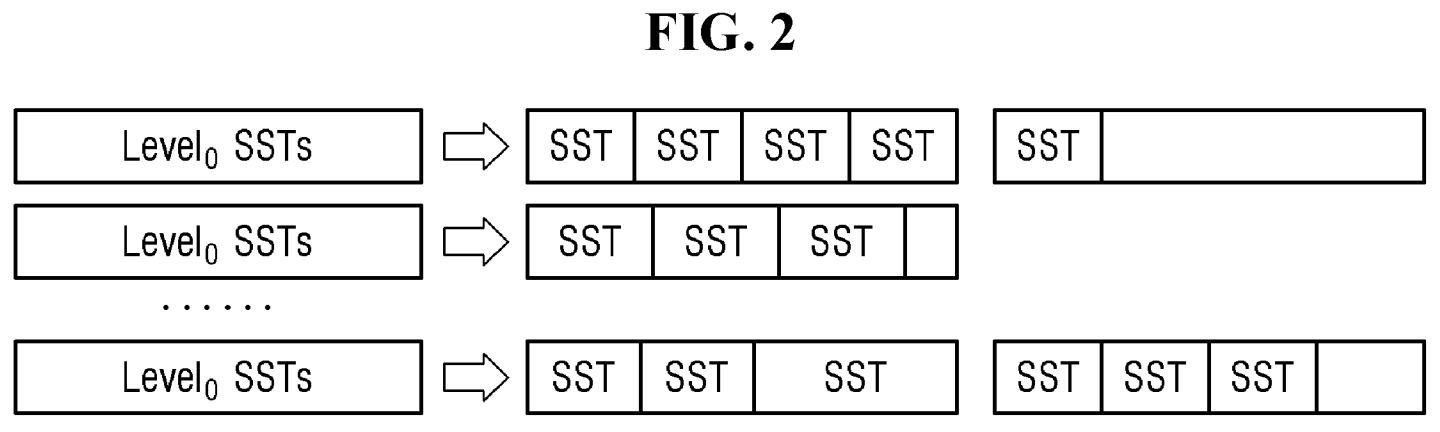

FIG. 2 illustrates correspondence relationship between levels of an LSM-tree and zones of a ZNS SSD.

Referring to FIG. 2, SST files of different levels are stored in different zones of the ZNS SSD.

During a compaction operation, the LSM-tree based storage engine sorts SST files in a compaction start level according to a specific rule, and selects an SST file with the highest priority to perform compaction on the selected SST file. Different priority sorting rules result in different priorities, and thus affect selection of SST files.

The RocksDB is used as an example to illustrate a process of selecting an SST file in the compaction start level in the related art.

According to an example, an SST file in the compaction start level whose key range at least partially overlaps with key ranges of SST files in a compaction output level is determined, and the determined SST file in the compaction start level and SST files in the output level, which have a key range at least partially overlapping with the key range of the determined SST file are combined into a SST set.

Figure 3:
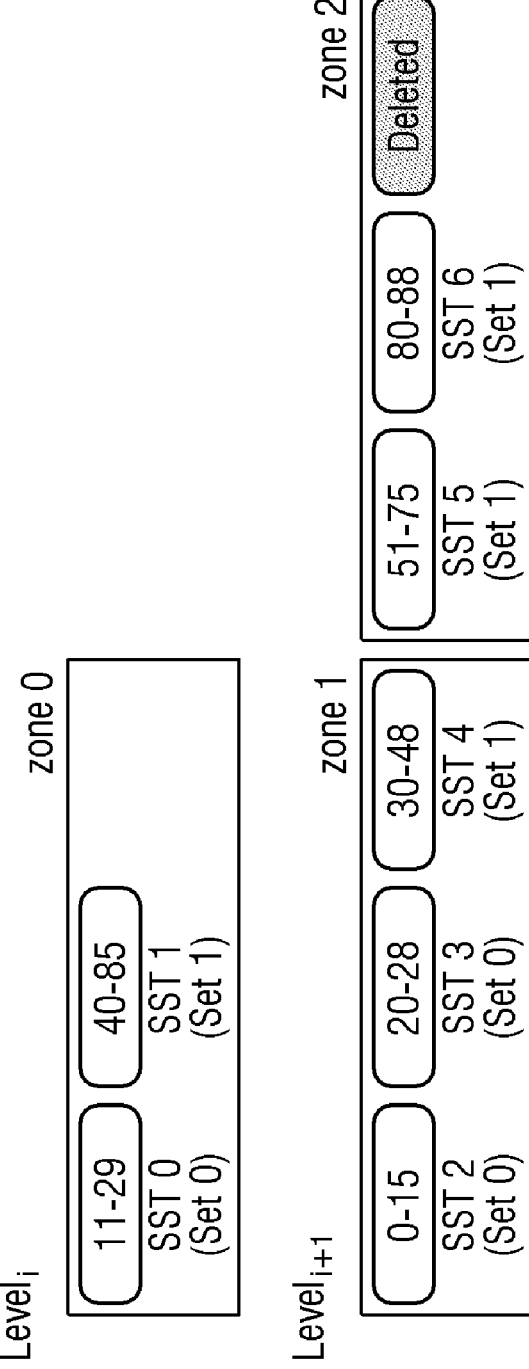
FIG. 3 illustrates an example of SST files in levels of an LSM-tree.

FIG. 3 illustrates an example of SST files in levels of an LSM.

Referring to FIG. 3, in an example, in which, the Level$_i$ is a compaction start level and the Level$_{i+1}$ is a compaction output level, an SST file (SST0) with keys (or a key range) 11-29 in Level$_i$, an SST file (SST2) with keys 0-15 and an SST file (SST3) with keys 20-28 in the Level$_{i+1}$ may be combined into an SST set 0: {SST0, SST2, SST3}, and an SST file (SST1) with keys 40-85 in the Level$_i$, an SST file (SST4) with keys 30-48, an SST file (SST5) with keys 51-75 and an SST file (SST6) with keys 80-88 in the Level$_{i+1}$ are combined into an SST set 1: {SST1, SST4, SST5, SST6}.

In the compaction operation, key overlapping ratios for respective SST sets are obtained. For example, a key overlapping ratio (ratio$_0$) for the SST set 0 and a key overlapping ratio (ratio$_1$) for the SST set 1 may be calculated as follows:

$$ratio_0 = (S2 + S3) \times 1024/S0,$$

$$ratio_1 = (S4 + S5 + S6) \times \frac{1024}{S1}.$$

Here, S0, S1, S2, S3, S4, S5, and S6 represent sizes of key ranges of SST0, and SST1, SST2, SST3, SST4, SST5 and SST6 respectively. For example, S0 is 19 (i.e., 29−11+1) and S2 is 16 (i.e., 15−0+1).

Based on the obtained ratios, a minimum value of ratio$_0$ and ratio$_1$ is determined, and a compaction operation is performed on SST files corresponding to the minimum value in the SST set. That is, SST files corresponding to the minimum ratio value in the SST set, among the obtained ratios, is prioritized from compaction operation.

Referring to FIG. 3, it is apparent that ratio$_0$<ratio$_1$, and accordingly, compaction is performed on SST0, SST2 and SST3 based on higher priority.

Figure 4:
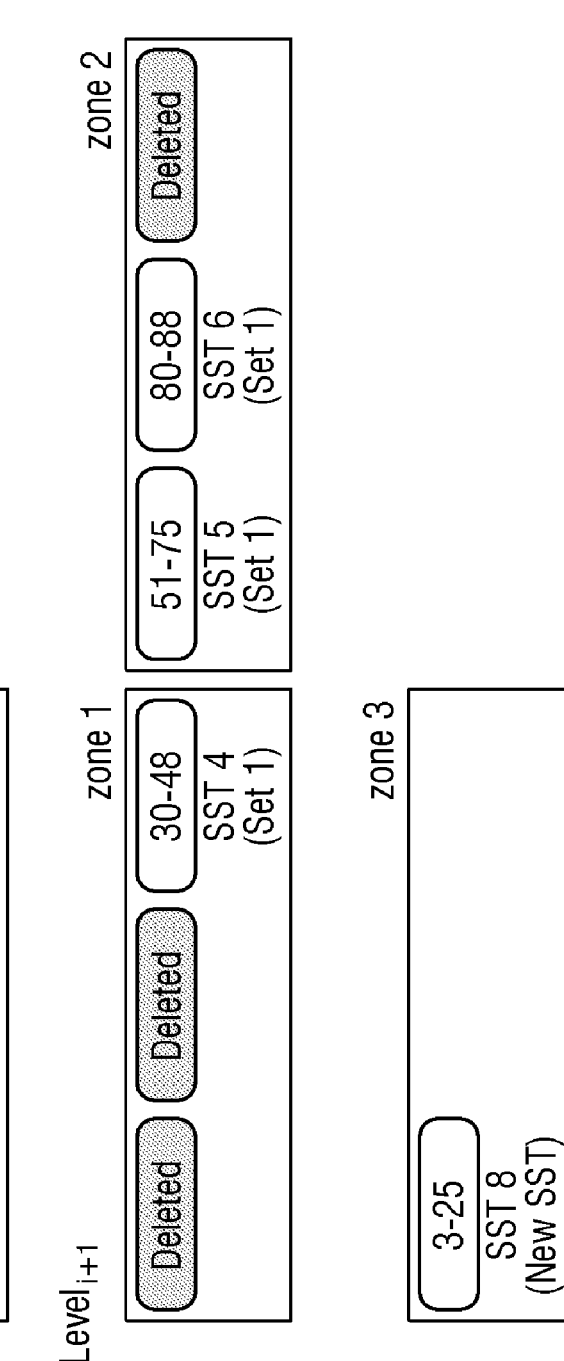
FIG. 4 illustrates SST files after compacting is completed.

FIG. 4 illustrates SST files after the compaction is completed. Referring to FIG. 4, a new SST file (SST8) generated by the compaction, and SST8 is written into Level$_{i+1}$ and SST0, SST2, SST3 are deleted.

After the compaction operation, since SST files that participated in the compaction operation are deleted, space corresponding to the deleted SST files in zones becomes invalid so that holes are formed. However, since there are still valid data in the zones with the holes, and an FW of the ZNS SSD has no garbage collection (GC) function, the zones with the hole cannot be reclaimed, which leads to space amplification.

As shown in FIG. 4, after the compaction for the SST set 0, since there is no zone that can be recycled, an additional zone is needed to store the newly generated SST8. The space amplification brings about a waste of storage space, which increases a total cost of ownership (TCO).

In order to solve the space amplification problem described above, the related art solution is to copy valid data in the zones with the holes (old zones) to other zones by the GC on the host side, and erase data in the zones with the hole, so that the zones is reclaimed.

Figure 5:
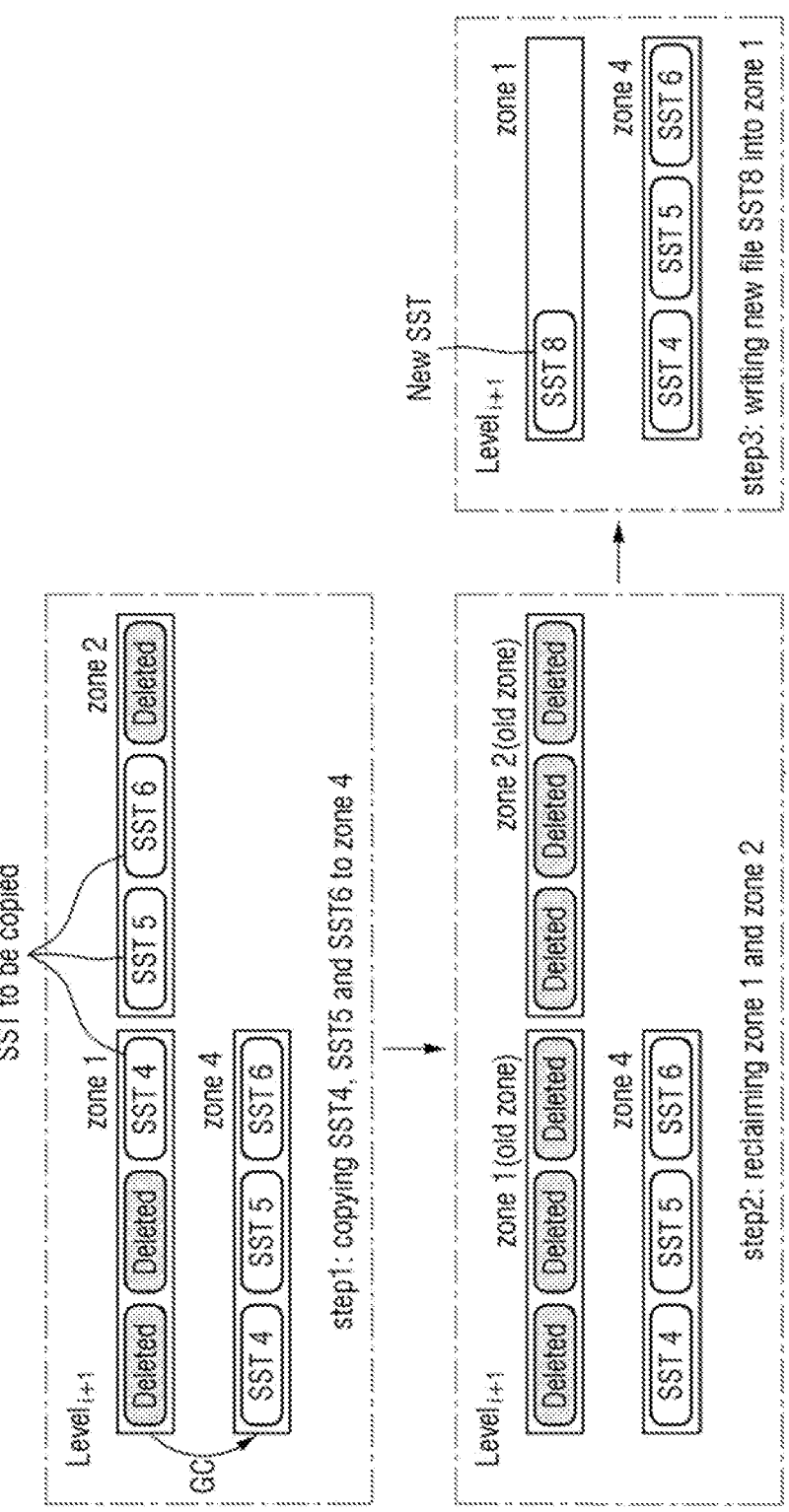
FIG. 5 illustrates a schematic diagram of a related art scheme for compacting.

FIG. 5 illustrates a schematic diagram of a related art method for compacting SST files.

In FIG. 5, Level$_{i+1}$ includes a valid file SST4 in zone 1 and valid files SST5 and SST6 in zone 2. In the related art compacting method, the valid file SST4 in zone 1 and the valid files SST5 and SST6 in zone 2 are copied to the zone 4, and thereafter zones 1 and 2 are reclaimed and a newly generated SST file (SST8) is stored in the reclaimed zone 1.

However, this host-based GC operation may have some disadvantages including, for example:

1) Occupying host side resources: host-based GC operations (e.g., processing IO requests, data transfer from a host side to a device side, metadata updating, etc.) occupy far more resources than GC at the device side;

2) Since more data needs to be moved, more IO requests need to be processed, which results in performance degradation; and 3) Although the space amplification is reduced, since the GC needs to move valid data and the valid data may need to be written multiple times, write amplification is caused.

The compaction method for SST files proposed in the disclosure may reduce the write amplification to a certain extent.

FIG. 6 illustrates a flowchart of a compaction method for SST files according to an embodiment of the disclosure.

Referring to FIG. 6, in operation S601, a plurality of first SST files in a first level of a Log Structure Merge Tree (LSM-Tree) and a plurality of second SST files in a second level of the LSM-Tree are determined in response to determining that a compaction operation needs to be performed on the first level. Here, a key range of each of the plurality of first SST files at least partially overlaps with key ranges of SST files in the second level, and a key range of each of the plurality of second SST files at least partially overlaps with key ranges of the plurality of first SST files. The second level may be a level of the LSM-Tree that is adjacent to the first level and higher than the first level. According to an embodiment, the plurality of first SST files in the first level of the LSM-Tree and the plurality of second SST files in the second level of the LSM-Tree may be determined based on a determination that a compaction operation is to be to be performed on the first level. For example, the plurality of first SST files in the first level of the LSM-Tree and the plurality of second SST files in the second level of the LSM-Tree may be determined based on a determination that a compaction operation is scheduled for the first level.

As an example, when the number of SST files in the first level exceeds a set value or a size of the SST files in the first level exceeds a predetermined capacity (e.g., a capacity of the first level or less), it may be determined that a compaction operation needs to be performed on the first level.

It should be understood by those skilled in the art that the first level is a start level involved in a compaction operation and the second level is an output level involved in the compaction operation.

For example, referring to FIG. 3, when it is determined that a compaction operation needs to be performed on the Level$_i$, the plurality of first SST files are SST0 and SST1, and the plurality of second SST files are SST2, SST3, SST4, SST5, and SST6.

In operation S602, compaction priorities of the plurality of first SST files are determining based on a key overlapping ratio between the each of the plurality of first SST files and SST files each of which has a key range at least partially overlapping with a key range of the each of the plurality of first SST files among the plurality of second SST files and attribute information of zones corresponding to the plurality of first SST files and the plurality of second SST files of the ZNS SSD.

As an example, the attribute information may indicate a space utilization rate of the zone.

As an example, the key overlapping ratio may be calculated based on a method of calculating the key overlapping ratio described with reference to FIG. 3.

It should be understood by those skilled in the art that the specific calculation of the key overlapping ratio is not limited to this, but may be any other calculation manner that may reflect an overlapping degree of keys.

As an example, the determining of the compaction priorities of the plurality of first SST files based on the key overlapping ratio and the attribute information of the zones corresponding to the plurality of first SST files and the plurality of second SST files of the ZNS SSD includes: determining predetermined types of attribute information of each of a plurality of zones corresponding to the each of the plurality of first SST files and the SST files each of which has a key range at least partially overlap with the key range of the each of the plurality of first SST files among the plurality of second SST files of the ZNS SSD; determining a factor corresponding to the each zone based on the predetermined types of attribute information of the each zone according to a preset rule; determining a compaction priority value of the each of the plurality of first SST files based on factors corresponding to the plurality of zones and the key overlapping ratio; and determining the compaction priorities according to compaction priority values of the plurality of first SST files.

As an example, the predetermined types of attribute information includes at least one of a ratio of a size of invalid files in the each zone to a capacity of the each zone, a usage duration of the each zone, and a reciprocal of a number of accesses to the each zone.

As an example, the invalid files include an SST file that is capable of being deleted through a compaction operation on the each of the plurality of first SST files and the SST files each of which has a key range at least partially overlapping with the key range of the each of the plurality of first SST files among the plurality of second SST files, and/or, the usage duration of the each zone indicates an interval between the time at which the each zone was last opened and the current time.

Figure 7:
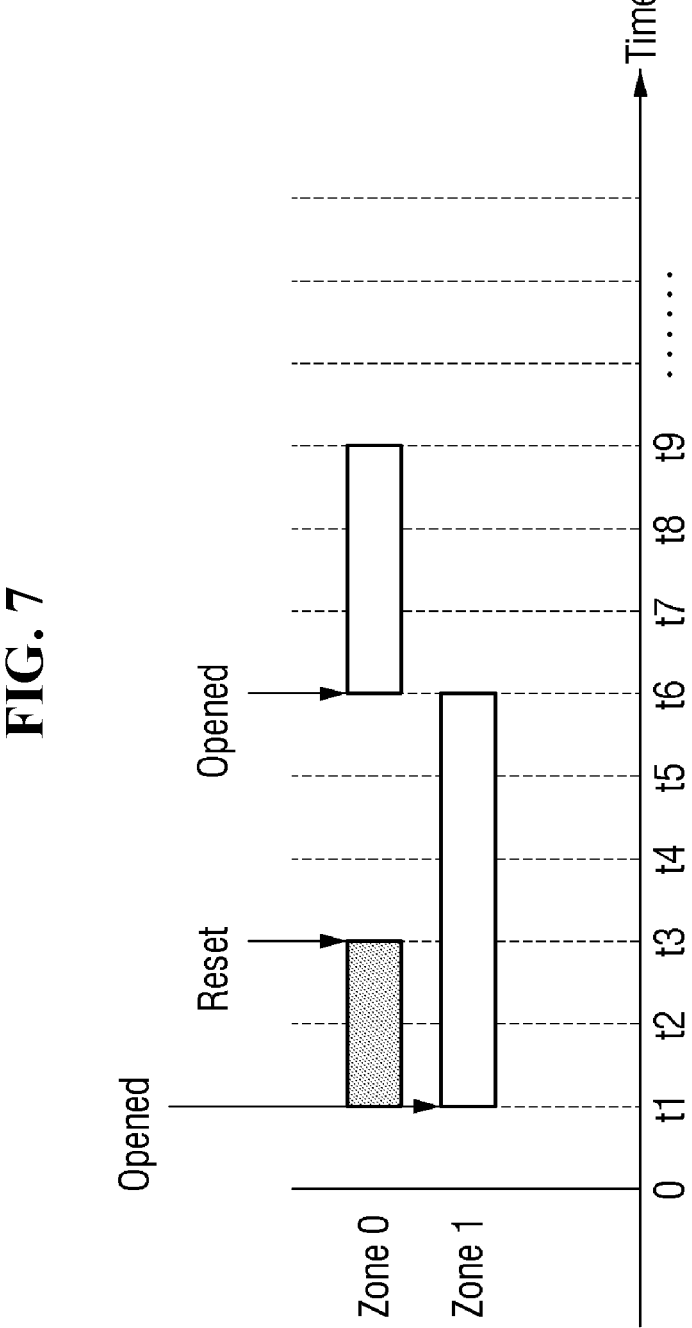
FIG. 7 illustrates an example of a usage duration of a zone and a number of accesses to the zone according to an embodiment of the disclosure.

FIG. 7 illustrates an example of usage durations and the numbers of accesses for zones.

Table 1 illustrates usage durations and the numbers of accesses for the zones corresponding to FIG. 7.

|  | usage duration | number of accesses |
|---|---|---|
| Zone 0 (z0) | t6-t9 | 12 |
| Zone 1 (z1) | t1-t3 | 23 |

As an example, the determining of the factor corresponding to the each zone based on the predetermined types of attribute information of the each zone according to the preset rule includes: performing weighted summation on the predetermined types of attribute information of the each zone to obtain the factor corresponding to the each zone.

For example, the factor corresponding to the each zone may be calculated as follows:

$$Factor = M \cdot W,$$

wherein $M = (m_1, m_2 \ldots m_N)$, $m_1, m_2 \ldots$ my denotes the predetermined types of attribute information (or attribute values), N denotes the number of the types of the attribute information, $W = (w_1, w_1 \ldots w_N)$, $w_1, w_1 \ldots w_N$ are weights corresponding to $m_1, m_2 \ldots m_N$, respectively, wherein $$\sum_{i=1}^{N} w_i = 1.$$

As an example, W may be preset or determined according to a preset rule. However, the disclosure is not limited thereto, and as such, W maybe determined in another manner.

Figure 8:
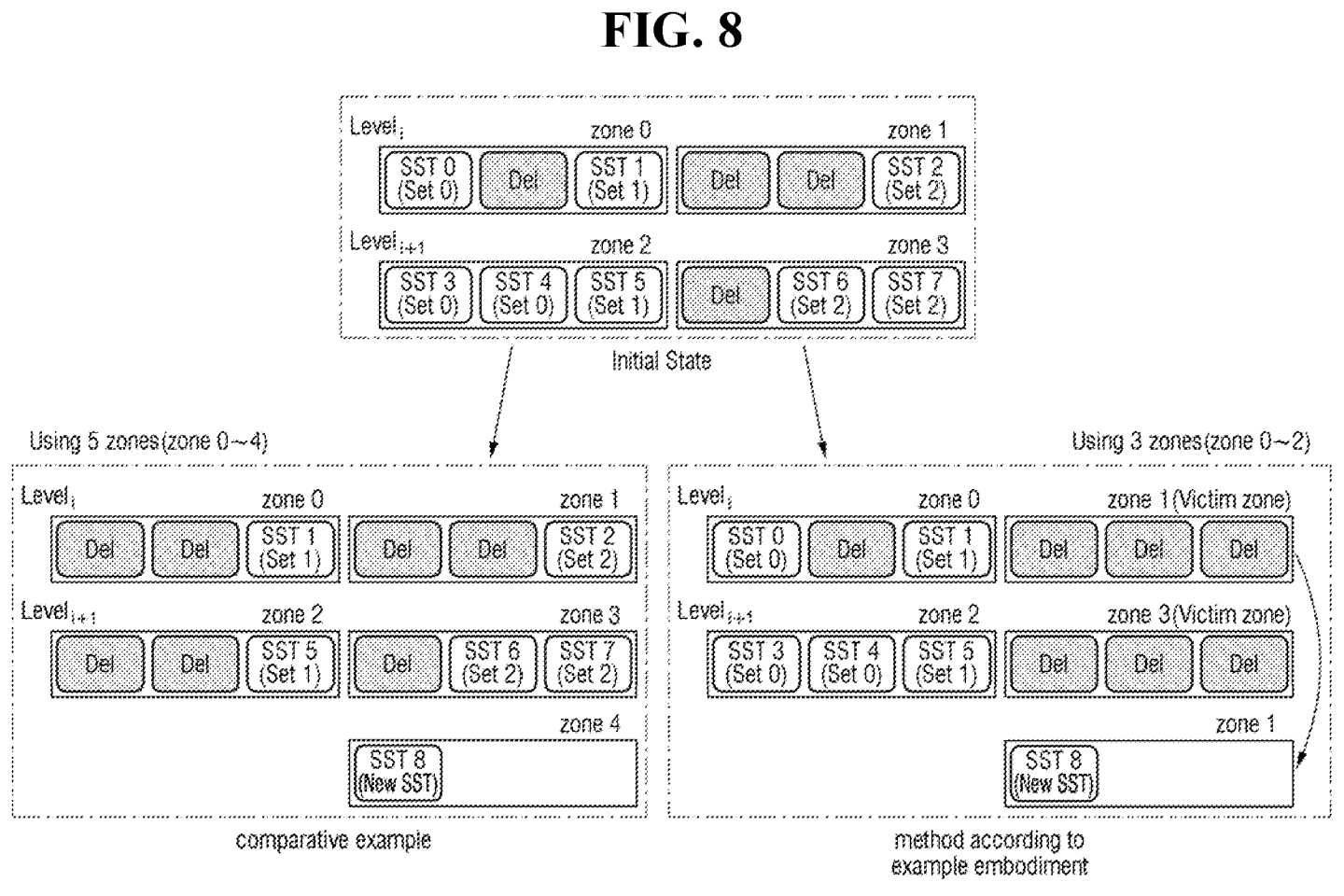

FIG. 8 is a diagram illustrating a comparison between a method for compacting SST files according to an embodiment of the disclosure and a related art method for compacting SST files.

For example, referring to FIG. 8, the plurality of first SST files are SST0, SST1, and SST2, and the plurality of second SST files are SST3, SST4, SST5, SST6, and SST7.

According to an embodiment of the disclosure, $Factor0_{134}$ and $Factor2_{134}$ that are factors for zones 0 and 2 corresponding to SST0 and SST3 and SST4 that are SST files each of which has a key range at least partially overlapping with a key range of SST0, $Factor0_{15}$ and $Factor2_{15}$ that are factors for zones 0 and 2 corresponding to SST1 and SST5 that is an SST file whose key range at least partially overlaps with a key range of SST1, and $Factor1_{267}$ and $Factor3_{267}$ that are factors for zones 1 and 3 corresponding to SST6 and SST7 that are SST files each of which has key range at least partially overlapping with a key range of SST2 may be obtained as above.

As an example, the determining of the compaction priority value of the each of the plurality of first SST files based on the factors corresponding to the plurality of zones and the key overlapping ratio may include determining a maximum value among the factors corresponding to the plurality of zones and determining the compaction priority value (or score) of the each of the plurality of first SST files based on the key overlapping ratio and the maximum value.

As an example, the determining of the compaction priority value of the each of the plurality of first SST files based on the key overlapping ratio and the maximum value may include using a ratio of the maximum value plus 1 to the key overlapping ratio as the compaction priority value of the each of the plurality of first SST files.

As an example, a score (or compaction priority value) of the each of the plurality of first SST files may be calculated as follows:

$$score = \frac{1 + max\{F_0, F_1, ...F_L\}}{overlappingRatio},$$

wherein $F_0$, $F_1$ . . . $F_L$ denotes respective factors of a plurality of zones corresponding to the each of the plurality of first SST files and SST files each of which has a key range at least partially overlapping with a key range of the each of the plurality of first SST files among the plurality of second SST files, and L denotes the number of zones of the plurality of zones.

For example, referring to FIG. 8, the number of zones of the plurality of zones corresponding to SST0, SST3, and SST4 may be 3 (i.e., the plurality of zones include zone 0, zone 2, and zone 2).

For example, a maximum value (max1) of $Factor0_{034}$ and $Factor2_{034}$, a maximum value (max2) of $Factor0_{15}$ and $Factor2_{15}$, and a maximum value (max1) of $Factor1_{267}$ and $Factor3_{267}$ may be determined.

For example, for SST0, its corresponding compaction priority value is (1+max1)/OverlappingRatio_SST0, wherein OverlappingRatio_SST0 indicates a key overlapping ratio between SST0 and both of SST3 and SST4 (i.e., an overlapping ratio between a key range of SST0 and key ranges of SST3 and SST4), and similarly, compaction priority values corresponding to SST1 and SST2 may be obtained.

As an example, the determining of the compaction priorities based on the compaction priority values of the plurality of first SST files may include determining an SST file having a greater compaction priority value as having a higher compaction priority.

Referring back to FIG. 6, in operation S603, compaction is performed on an SST file having a higher compaction priority among the plurality of first SST files based on priority.

As an example, the performing of the compaction on the SST file having the higher compaction priority among the plurality of first SST files based on priority includes: selecting the SST file having the higher compaction priority among the plurality of first SST files based on priority and performing the compaction on the selected SST file having the higher compaction priority and SST files each of which has a key range at least partially overlapping with a key range of the selected SST file having the higher compaction priority among the plurality of second SST files.

For example, referring to FIG. 8, after calculation, SST2 has the greatest compaction priority value, and thus compaction is performed on SST2 based on the higher priority. That is, the compaction is performed on SST2, SST6 and SST7 based on the higher priority. During the compaction, zones 1 and 2 may be reclaimed, and then SST8 that is a newly generated SST file is stored in zone 1. It can be seen that only three (3) zones are occupied after the compaction.

According to the related art method, compaction is performed on SST0, SST3 and SST4 because an overlapping ratio between a key range of SST0 and key ranges of SST3 and SST4 is the smallest. Referring to FIG. 7, after the compaction operation, 5 zones are occupied because there is still valid data in zones 1 and 3.

As an example, zone resources may be managed by a zone manager. For example, the zone manager may pool the zone resources of the ZNS SSD, be responsible for allocating zones from the zone pool, and synchronize zone metrics on the ZNS SSD.

As an example, when data needs to be stored, a provisioning module of the zone manager may allocate a new zone for the data to be written, and the provisioning module may reclaim a zone when all data in the zone is invalid.

As an example, a metric module of the zone manager may provide metrics for calculation of factors corresponding to zones.

The compaction method for SST files according to embodiments of the disclosure are described above with reference to FIGS. 1 to 8, and a compaction device for SST files and a computer readable storage medium according to embodiments of the disclosure are described below with reference to FIG. 9.

Figure 9:
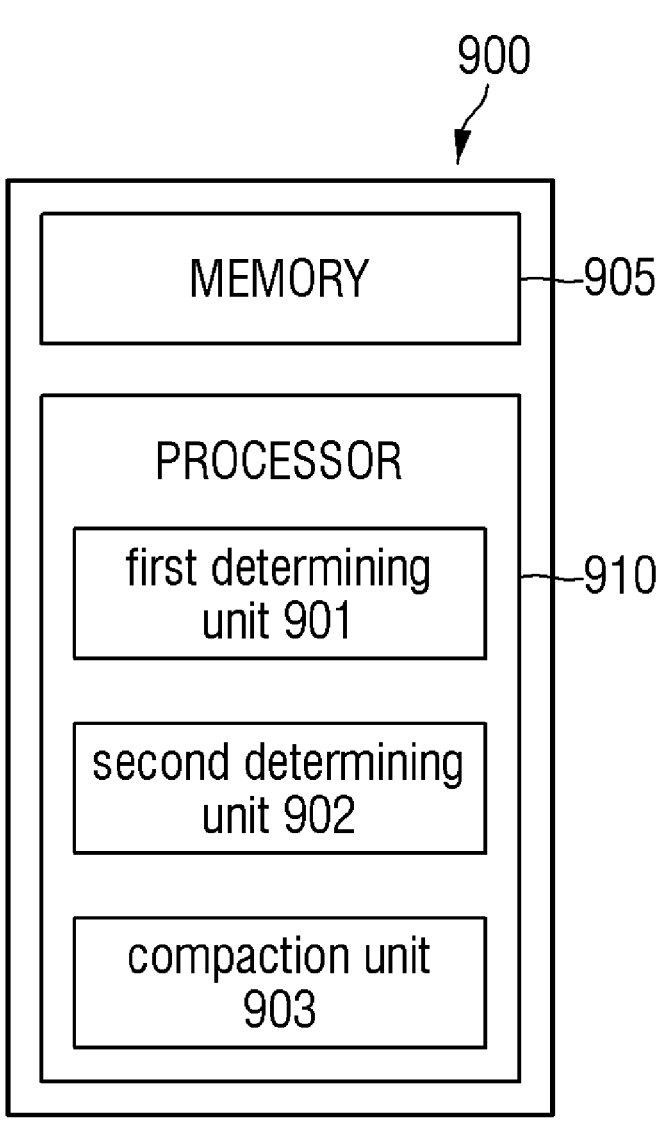
FIG. 9 illustrates a block diagram of a structure of a compaction device for SST files according to an embodiment of the disclosure.

FIG. 9 illustrates a block diagram of a structure of a compaction device 900 for SST files according to embodiments of the disclosure.

Referring to FIG. 9, the compaction device for SST files 900 may include a memory 905 and a processor 910. However, the disclosure is not limited thereto, and as such, according to another embodiment, other components may be included in the compaction device 900. For example, according to another embodiment, the compaction device

900 may include a specialized processor or other electronic circuitry configured to perform the compaction operation.

According to an embodiment, the memory 905 may store one or more instructions or software codes, and the processor 910 may execute the one or more instructions to implement a first determination unit 901, a second determining unit 902 and a compacting unit 903.

It should be understood by those skilled in the art that the compaction device for SST files 900 may additionally include other components or other units, and that at least one of components or units included in the compaction device for SST files 900 may be combined or divided.

As an example, the first determining unit 901 may be configured to determine a plurality of first SST files in a first level of a Log Structure Merge Tree (LSM-Tree) and a plurality of second SST files in a second level in response to determining that a compaction operation needs to be performed on the first level. Here, a key range of each of the plurality of first SST files at least partially overlaps with key ranges of SST files in the second level, and a key range of each of the plurality of second SST files at least partially overlaps with key ranges of the plurality of first SST files. The second level may be a level of the LSM-Tree that is adjacent to the first level and higher than the first level.

As an example, the second determining unit 902 may be configured to determine compaction priorities of the plurality of first SST files based on a key overlapping ratio between the each of the plurality of first SST files and SST files each of which has a key range at least partially overlapping with a key range of the each of the plurality of first SST files among the plurality of second SST files and attribute information of zones corresponding to the plurality of first SST files and the plurality of second SST files of the ZNS SSD.

As an example, the compacting unit 903 may be configured to perform compaction on an SST file having a higher compaction priority among the plurality of first SST files based on priority.

As an example, the second determining unit 902 may be configured to determine predetermined types of attribute information of each of a plurality of zones corresponding to the each of the plurality of first SST files and the SST files each of which has a key range at least partially overlapping with the key range of the each of the plurality of first SST files among the plurality of second SST files of the ZNS SSD, determine a factor corresponding to the each zone based on the predetermined types of attribute information of the each zone according to a preset rule; determine a compaction priority value of the each of the plurality of first SST files based on factors corresponding to the plurality of zones and the key overlapping ratio, and determine the compaction priorities according to compaction priority values of the plurality of first SST files.

As an example, the predetermined types of attribute information includes at least one of a ratio of a size of invalid files in the each zone to a capacity of the each zone, a usage duration of the each zone, and a reciprocal of a number of accesses to the each zone.

As an example, the second determining unit 902 may be configured to perform weighted summation on the predetermined types of attribute information of the each zone to obtain the factor corresponding to the each zone.

As an example, the second determining unit 902 may be configured to determine a maximum value among the factors corresponding to the plurality of zones, and determine the compaction priority value of the each of the plurality of first SST files based on the key overlapping ratio and the maximum value.

As an example, the second determining unit 902 may be configured to use a ratio of the maximum value plus 1 to the key overlapping ratio as the compaction priority value of the each of the plurality of first SST files.

As an example, the second determining unit 902 may be configured to determine an SST file having a greater compaction priority value as having a higher compaction priority.

As an example, the compacting unit 903 may be configured to select the SST file having the higher compaction priority among the plurality of first SST files based on priority, and perform the compaction on the selected SST file having the higher compaction priority and SST files each of which has a key range at least partially overlapping with a key range of the selected SST file having the higher compaction priority among the plurality of second SST files.

As an example, the invalid files includes an SST file that is capable of being deleted through a compaction operation on the each of the plurality of first SST files and the SST files each of which has a key range at least partially overlapping with the key range of the each of the plurality of first SST files among the plurality of second SST files, and/or, the usage duration of the each zone indicates an interval between time the each zone was last opened and current time.

According to an example embodiment of the disclosure, there is provided an electronic device including a processor, and a memory configured to store instructions that when executed by the processor cause the processor to perform the compaction method for the SST files as described herein.

According to an example embodiment of the disclosure, there is provided a computer readable storage medium storing a computer program that when executed by a processor causes the processor to implement the compaction method for the SST files as described herein. Examples of computer-readable storage media here include: read only memory (ROM), random access programmable read only memory (PROM), electrically erasable programmable read only memory (EEPROM), random access memory (RAM), dynamic random access memory (DRAM), static random access memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, Blu-ray or optical disc storage, hard disk drive (HDD), solid state Hard disk (SSD), card storage (such as multimedia card, secure digital (SD) card or extreme digital (XD) card), magnetic tape, floppy disk, magneto-optical data storage device, optical data storage device, hard disk, solid state disk and any other devices configured to store computer programs and any associated data, data files, and data structures in a non-transitory manner, and provide the computer programs and any associated data, data files, and data structures to the processor or the computer, so that the processor or the computer can execute the computer program. The computer program in the above-mentioned computer-readable storage medium may run in an environment deployed in computing equipment such as a client, a host, an agent device, a server, etc. In addition, in one example, the computer program and any associated data, data files and data structures are distributed on networked computer systems, so that computer programs and any associated data, data files, and data structures are stored, accessed, and executed in a distributed manner through one or more processors or computers.

According to an embodiment of the disclosure, there may be provided a computer program product, wherein instructions in the computer program product may be executed by a processor of a computer device to implement the compaction method for SST files described herein.

Those skilled in the art will easily think of other embodiments of the disclosure after considering the specification and practicing the disclosure disclosed herein. The disclosure is intended to cover any variations, uses, or adaptive changes of the disclosure. These variations, uses, or adaptive changes follow the general principles of the disclosure and include common knowledge or related art technical means in the technical field that are not disclosed in the disclosure. The specification and the embodiments are to be regarded as example only, and the actual scope and spirit of the disclosure are pointed out by the following claims.

What is claimed is:

1. A compaction method for sorted string table (SST) files stored in zones of a zoned namespace solid state drive (ZNS SSD), comprising:

determining, based on a compaction operation for a first level of a Log Structure Merge Tree (LSM-Tree), a plurality of first SST files in the first level and a plurality of second SST files in a second level, wherein at least one key range among key ranges of the plurality of first SST files at least partially overlaps with key ranges of the plurality of second SST files in the second level, and at least one key range among the key ranges of the plurality of second SST files at least partially overlaps with the key ranges of the plurality of first SST files, wherein the second level is a level of the LSM-Tree that is adjacent to the first level and higher than the first level;

obtaining a key overlapping ratio for each of the plurality of first SST files based on a size of the key range of each of the plurality of first SST files and one or more second SST files, among the plurality of second SST files, the one or more second SST files comprising a key range at least partially overlapping with a key range of each of the plurality of first SST files;

obtaining compaction priority scores, each corresponding to one of the plurality of first SST files based on a plurality of factor values, each of the plurality of factor values obtained based on a product of attribute information of each of a plurality of zones corresponding to each of the respective one of the plurality of first SST files and a weight respectively associated with each of the zones corresponding to each of the respective one of the plurality of first SST files;

obtaining priority information of each of the plurality of first SST files based on the key overlapping ratio of each of the plurality of first SST files and the compaction priority score of each of the plurality of first SST files; and performing compaction on a first SST file having a highest compaction priority among the plurality of first SST files based on the priority information by deleting the first SST file in the respective zone and reclaiming the respective zone for storing a new SST file, wherein the obtaining the compaction priority score of each of the plurality of first SST files further comprises determining a maximum value among the plurality of factor values, and wherein the performing the compaction on the first SST file having the highest compaction priority among the plurality of first SST files based on the compaction priority score of each of the plurality of first SST files.

2. The method of claim 1, wherein the obtaining the priority information further comprises:

determining one or more types of the attribute information of each of the plurality of zones corresponding to the each of the plurality of first SST files and the one or more second SST files;

determining each of the plurality of factor values based on the one or more types of the attribute information of each of the plurality of zones according to a preset rule;

determining the compaction priority score of each of the plurality of first SST files based on the plurality of factor values corresponding to the plurality of zones and the key overlapping ratio; and determining the priority information based on the compaction priority scores of the plurality of first SST files.

3. The method of claim 2, wherein the one or more types of the attribute information comprises at least one of a ratio of a size of invalid files in each of the plurality of zones to a capacity of the respective zone, a usage duration of each of the plurality of zones, and a reciprocal of a number of accesses to each of the plurality of zones.

4. The method of claim 3, wherein the invalid files comprise an SST file that is capable of being deleted through a compaction operation on the each of the plurality of first SST files and the one or more second SST files or the usage duration of the each zone indicates an interval between time the each zone was last opened and current time.

5. The method of claim 2, wherein the determining of the factor values respectively corresponding to each of the plurality of zones comprises:

performing weighted summation on the one or more types of the attribute information of each of the plurality of zones.

6. The method of claim 2, wherein the determining of the compaction priority score of each of the plurality of first SST files further comprises:

determining the compaction priority score of each of the plurality of first SST files based on the key overlapping ratio and the maximum value.

7. The method of claim 6, wherein the determining of the compaction priority score of the each of the plurality of first SST files based on the key overlapping ratio and the maximum value comprises:

using a ratio of the maximum value plus 1 to the key overlapping ratio as the compaction priority score of the each of the plurality of first SST files.

8. The method of claim 2, wherein the determining of the priority information comprises:

determining an SST file, among two of the plurality of first SST files, having a greater compaction priority score as having a higher compaction priority, and wherein the performing of the compaction on the SST file having the higher compaction priority among the two of the plurality of first SST files comprises:

selecting the SST file having the higher compaction priority among the two of the plurality of first SST files and performing the compaction on the selected SST file having the higher compaction priority and SST files each of which has a key range at least partially overlapping with a key range of the selected SST file having the higher compaction priority among the plurality of second SST files.

9. An electronic device comprising:

a processor; and a memory configured to store instructions that when executed by the processor cause the processor to:

identify one or more first SST files and one or more second SST files, wherein at least one key range among key ranges of the one or more first SST files at least partially overlaps at least one key range among key ranges of the one or more second SST files;

obtain a key overlapping ratio for each of the one or more first SST files based on a size of the key range of each of the one or more first SST files and the one or more second SST files, the one or more second SST files comprising a key range at least partially overlapping with a key range of each of the one or more first SST files;

obtain compaction priority scores, each corresponding to one of the one or more first SST files based on a plurality of factor values, each of the plurality of factor values obtained based on a product of attribute information of each of a plurality of zones corresponding to each of the respective one of the one or more first SST files and a weight respectively associated with each of the zones corresponding to each of the respective one of the one or more first SST files;

obtain priority information each of the one or more first SST files based on the key overlapping ratio of each of the one or more first SST files and the compaction priority score of each of the plurality of first SST files;

perform compaction on a first SST file, among the one or more first SST files based on the priority information by deleting the first SST file in the respective zone and reclaiming the respective zone for storing a new SST file, wherein the obtaining the compaction priority score of for each of the one or more first SST files further comprises determining a maximum value among the plurality of factor values, and wherein the performing the compaction on the first SST file having a highest compaction priority among the one or more first SST files based on the compaction priority score of each of the plurality of first SST files.

10. A compaction method for sorted string table (SST) files stored in zones of a zoned namespace solid state drive (ZNS SSD), comprising:

determining, based on a compaction operation for a first level of a Log Structure Merge Tree (LSM-Tree), a plurality of first SST files in the first level and a plurality of second SST files in a second level, wherein at least one key range among key ranges of the plurality of first SST files at least partially overlaps with key ranges of the plurality of second SST files in the second level, and at least one key range among the key ranges of the plurality of second SST files at least partially overlaps with the key ranges of the plurality of first SST files, wherein the second level is a level of the LSM-Tree that is adjacent to the first level and higher than the first level;

obtaining a key overlapping ratio for each of the plurality of first SST files based on a size of the key range of each of the plurality of first SST files and one or more second SST files, among the plurality of second SST files, the one or more second SST files comprising a key range at least partially overlapping with a key range of each of the plurality of first SST files;

determining one or more types of the attribute information of each of a plurality of zones corresponding to the each of the plurality of first SST files and the one or more second SST files;

obtaining compaction priority scores, each corresponding to one of the plurality of first SST files based on a plurality of factor values, each of the plurality of factor values corresponding to each of the plurality of zones based on the one or more types of the attribute information of each of the plurality of zones according to a preset rule;

obtaining priority information of each of the plurality of first SST files based on the key overlapping ratio of each of the plurality of first SST files and the compaction priority score of each of the plurality of first SST files; and performing compaction on a first SST file having a highest compaction priority among the plurality of first SST files based on the priority information by deleting the first SST file in the respective zone and reclaiming the respective zone for storing a new SST file.

11. The method of claim 10, the one or more types of the attribute information comprises at least one of a ratio of a size of invalid files in each of the plurality of zones to a capacity of the respective zone, a usage duration of each of the plurality of zones, and a reciprocal of a number of accesses to each of the plurality of zones.

12. The method of claim 11, wherein the invalid files comprise an SST file that is capable of being deleted through a compaction operation on the each of the plurality of first SST files and the one or more second SST files or the usage duration of the each zone indicates an interval between time the each zone was last opened and current time.

13. The method of claim 10, wherein the determining of a factor value, among the plurality of factor values, corresponding to each of the plurality of zones comprises:

performing weighted summation on the one or more types of the attribute information of each of the plurality of zones.

14. The method of claim 10, wherein the determining of the compaction priority score of each of the plurality of first SST files comprises:

determining a maximum value among the plurality of factor values corresponding to the plurality of zones; and determining the compaction priority score of each of the plurality of first SST files based on the key overlapping ratio and the maximum value.

15. The method of claim 14, wherein the determining of the compaction priority score of the each of the plurality of first SST files based on the key overlapping ratio and the maximum value comprises:

using a ratio of the maximum value plus 1 to the key overlapping ratio as the compaction priority score of the each of the plurality of first SST files.

16. The method of claim 10, wherein the determining of the priority information comprises:

determining an SST file, among two of the plurality of first SST files, having a greater compaction priority score as having a higher compaction priority, and wherein the performing of the compaction on the SST file having the higher compaction priority among the two of the plurality of first SST files comprises:

selecting the SST file having the higher compaction priority among the two of the plurality of first SST files and performing the compaction on the selected SST file having the higher compaction priority and SST files each of which has a key range at least partially overlapping with a key range of the selected SST file having the higher compaction priority among the plurality of second SST files.

* * * * *